(12) United States Patent
Kaneyuki et al.

(10) Patent No.: US 6,625,966 B2
(45) Date of Patent: Sep. 30, 2003

(54) MOWING MACHINE

(75) Inventors: Hitoshi Kaneyuki, Yoshi-machi (JP); Hideo Saneshige, Yoshii-machi (JP)

(73) Assignee: Chikusui Canycom, Inc., Fukuoka (JP)

( * ) Notice: Subject to any disclaimer, the term of this patent is extended or adjusted under 35 U.S.C. 154(b) by 0 days.

(21) Appl. No.: 09/902,602

(22) Filed: Jul. 12, 2001

(65) Prior Publication Data

US 2002/0005310 A1 Jan. 17, 2002

(30) Foreign Application Priority Data

Jul. 14, 2000 (JP) ........................................ 2000-215051

(51) Int. Cl.[7] ............................................... A01D 34/03
(52) U.S. Cl. ......................................... 56/14.7; 56/11.4
(58) Field of Search ................................ 56/10.8, 14.7, 56/16.7, 11.1, 11.4, 11.5, 11.8, 14.9, 15.3, 15.9, DIG. 22; 180/233, 376

(56) References Cited

U.S. PATENT DOCUMENTS

| | | | | |
|---|---|---|---|---|
| 1,885,427 A | * | 11/1932 | Gabli | 180/233 |
| 2,737,736 A | * | 3/1956 | MacDonald | 180/233 |
| 4,321,783 A | * | 3/1982 | Kawasaki et al. | 56/15.8 |
| 4,804,060 A | * | 2/1989 | Iritani | 180/233 |
| 4,977,733 A | * | 12/1990 | Samejima et al. | 327/408 |
| 5,467,839 A | * | 11/1995 | Yoshio | 180/233 |
| 5,483,789 A | * | 1/1996 | Gummerson | 56/14.7 |
| 5,564,518 A | * | 10/1996 | Ishii et al. | 180/242 |
| 6,237,957 B1 | * | 5/2001 | Takekata et al. | 180/900 |
| 6,276,119 B1 | * | 8/2001 | Oshima et al. | 56/15.9 |
| 6,296,073 B1 | * | 10/2001 | Rioux et al. | 180/233 |
| 6,470,659 B2 | * | 10/2002 | Shimamura et al. | 56/14.7 |

FOREIGN PATENT DOCUMENTS

| | | | |
|---|---|---|---|
| JP | 60-131323 | * | 7/1985 |
| JP | 60-146728 | * | 9/1985 |
| JP | 5-23038 | * | 2/1993 |

* cited by examiner

Primary Examiner—Robert E. Pezzuto
Assistant Examiner—Nathan Mammen
(74) Attorney, Agent, or Firm—Rader, Fishman & Grauer PLLC

(57) ABSTRACT

A mowing machine having a four-wheel drive mechanism, together with a mowing unit below the machine body. The mowing machine has an engine in front or at the rear of the traveling machine body, a transmission case close to the engine, and the four-wheel drive mechanism for allowing driving front and rear wheels by transmitting drive force from the transmission case to rear and front axle cases, wherein a remote transmission part for transmitting the drive force to the axle case located more remote from the transmission case in the four-wheel drive mechanism is formed in an upwardly bent or curved shape, and a space for placing the mowing unit is provided below the remote transmission part. The mowing unit is provided below the traveling machine body movably upwards or downwards, and an expansion shaft expansible in an axial core direction is used to transmit the drive force from the engine to the mowing unit.

7 Claims, 13 Drawing Sheets

MOWING MACHINE

BACKGROUND OF THE INVENTION

1. Field of the Invention

This invention relates to a mowing machine, which has a mowing blade unit and makes traveling with drive wheels driven by an engine.

2. Description of the Prior Art

A riding mowing machine manipulated by an operator seated on a traveling machine body is well known as a conventional mowing machine. This riding mowing machine involves a mowing machine having a vertically movable mowing unit below the traveling machine body and an engine in front or at the rear of the traveling machine body. The above mowing machine also has a transmission case close to the engine and applies drive force from the transmission case to drive front or rear wheels for allowing the traveling machine body to travel.

The above mowing machine further has a transmission mechanism between the mowing unit and the engine to transmit drive force from the engine to the mowing unit. The mowing unit is allowed to move upwards to bring the mowing unit to a stop for normal traveling requiring no mowing works. On the other hand, the mowing unit is allowed to move downwards for operative traveling requiring mowing works.

The above mowing machine performs the mowing works by allowing the traveling machine body to travel with the mowing unit driven after having allowed the mowing unit to move downwards.

On the other hand, for the purpose of avoiding a bad influence on stable traveling performance, the mowing machine permits no much vehicle height (the overall height), and hence, no quite large space below the traveling machine body. For that reason, when a four-wheel drive (4WD) mechanism is applied to a traveling drive system for improvement on traveling stability, for instance, it is difficult to place both a 4WD transmission system and a support mechanism of the mowing unit below the traveling machine body.

Accordingly, the placement of both the 4WD transmission system and the support mechanism of the mowing unit below the traveling machine body brings about such defects that a stroke of the mowing unit for upward or downward movement is made smaller and that a large space is not provided on the drive system side, resulting in a problem in an increase in restrictions on the specification of the mowing machine.

On the other hand, since the riding mowing machine normally uses pulleys and belts for the transmission mechanism of the mowing unit, the relative height of a pulley shaft on the input shaft side to a pulley shaft on the output shaft side and the vertical positions of both the pulley shafts vary with the upward or downward movement of the mowing unit, resulting in no smooth transmission of drive force in some cases.

SUMMARY OF THE INVENTION

It is a first object of the present invention to provide a four-wheel drive riding mowing machine having a mowing unit below a machine body such that the mowing machine has the overall height as much as traveling stability is maintained.

A second object of the present invention is to transmit drive force to the mowing unit smoothly when the mowing unit is allowed to move upwards or downwards.

The characteristics of the present invention for attaining the above objects are as follows.

Firstly, there is provided a mowing machine having a mowing unit below a traveling machine body, an engine in front or at the rear of the traveling machine body and a transmission case close to the engine. The mowing machine comprises a four-wheel drive mechanism for allowing driving front and rear wheels by transmitting drive force from the transmission case to rear and front axle cases, wherein a remote transmission part for transmitting the drive force to one axle case located more remote from the transmission case in the four-wheel drive mechanism is formed in an upwardly bent or curved shape, and a space for placement of the mowing unit is provided below the remote transmission part.

Secondly, the remote transmission part has a first transmission shaft connected to an output shaft for outputting the drive force from the transmission case to the more remote axle case, a second transmission shaft connected to an input shaft of the above axle case and a connection part for connecting the first and second transmission shafts together, and the first and second transmission shafts are connected together in the shape of an angle through the connection part.

Thirdly, the mowing unit is supported movably upwards or downwards.

Fourthly, an expansion shaft expansible in an axial core direction is provided in a transmission mechanism for supplying the drive force to the mowing unit.

Fifthly, the expansion shaft is composed of an externally cylindrical part and an inserted shaft inserted into the externally cylindrical part slidably in an axial core direction, while allowing transmission of the drive force of the externally cylindrical part in a rotary direction.

Sixthly, a gear case for allowing output of the drive force from the engine to the mowing unit is provided in the transmission mechanism, an output part of the gear case is one-sided leftwards or rightwards from the center of the traveling machine body, and an input end of the expansion shaft is connected to the output part.

BRIEF DESCRIPTION OF THE DRAWINGS

The foregoing and other objects and features of the invention will become apparent from the following description of the embodiment of the invention with reference to the accompanying drawings, in which.

DETAILED DESCRIPTION OF THE PREFERRED EMBODIMENT

Figure 1:
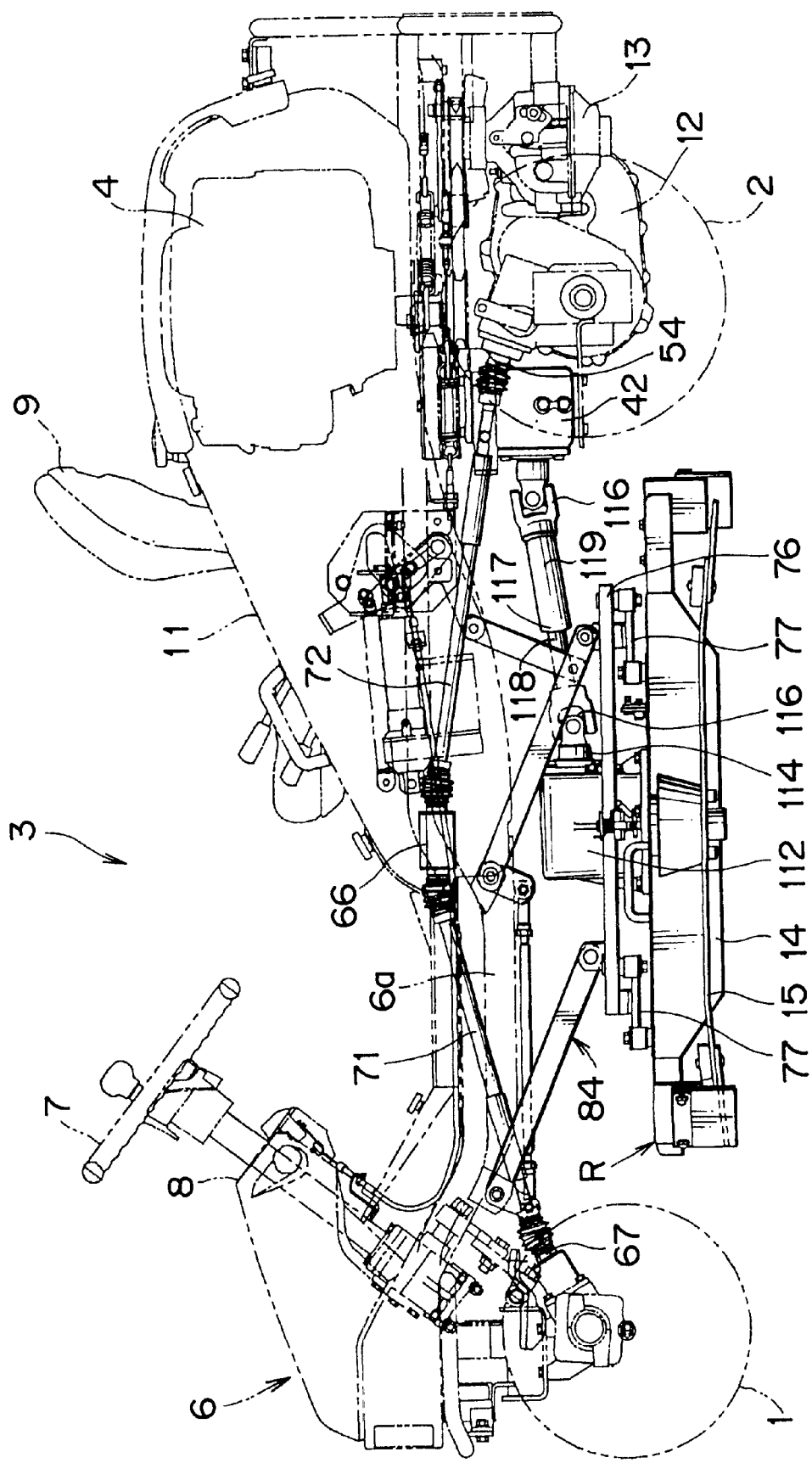
FIG. 1 is a side view in perspective showing a mowing machine according to the present invention.
Figure 2:
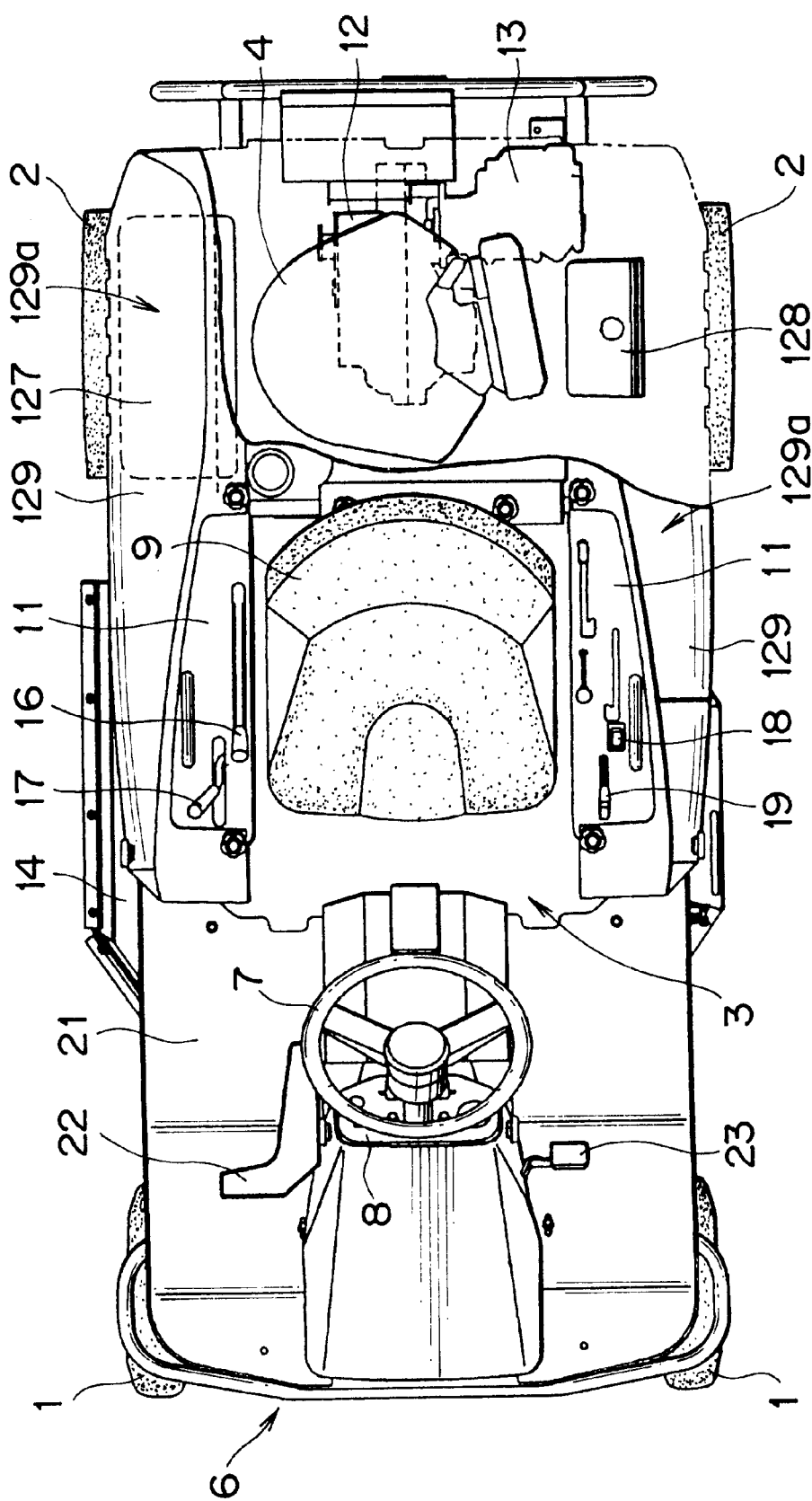
FIG. 2 is a plan view showing the mowing machine according to the present invention.
Figure 3:
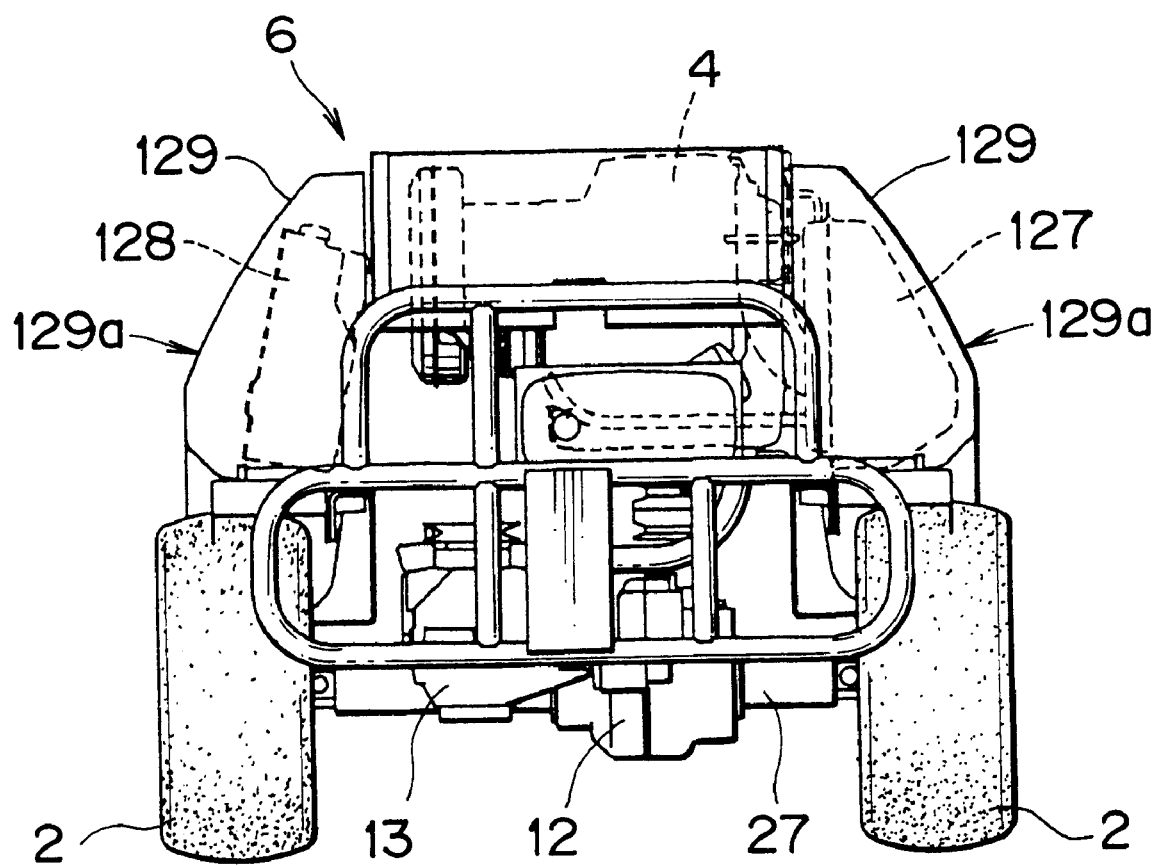
FIG. 3 is a rear view showing the mowing machine according to the present invention.

FIGS. 1, 2 and 3 are a side view, a plan view and a rear view of a mowing machine according to the present invention respectively. The mowing machine has an operator cab 3 on the front side of a traveling machine body 6 supported with front and rear wheels 1, 2, and an engine 4 on the rear side thereof. The engine 4 is mounted on the rear side of a machine frame 6a.

The mowing machine also has a seat 9 in the operator cab 3. A front panel 8 having a handle 7 is provided in front of the seat 9, and a side panel 11 is provided on each side of the seat 9. The side panels 11 and the front panel 8 have operating parts as will be described later. The seat 9 is placed in front of the engine 4.

The mowing machine further has a transmission case 12 below the engine 4, and a hydrostatic transmission (HST) 13 is mounted to the transmission case 12. Drive force from the engine 4 is supplied to the HST 13 and is then outputted to a transmission housed in the transmission case 12 after being subjected to variable speed change by the HST 13. The drive force outputted to the transmission is further subjected to speed change by the transmission and is then outputted to the front and rear wheels 1, 2, as will be described later, and as a result, the traveling machine body 6 starts traveling.

The front and rear wheels 1, 2 and the handle 7 are connected together for an interlocking operation through a steering mechanism as will be described later. Thus, the pivotal operation of the handle 7 provides a steered angle to each of the front and rear wheels 1, 2 for steering the traveling machine body 6. The mowing machine further has a mowing blade unit 14 below the traveling machine body 6 as a vertically and laterally slidable mowing unit.

The mowing blade unit 14 has a rotatably axial-supported mowing blade 15 on the inside and constitutes a rotary cutter for mowing out grass or the like through rotation of the mowing blade 15 by driving the mowing blade 15 for rotation. For that reason, drive force is transmitted from the engine 4 into the mowing blade unit 14 as will be described later.

The side panels 11 are provided with a mowing blade clutch lever 16 for controlling connection or disconnection of the drive force transmitted to the mowing blade unit 14, a speed change lever 17 for speed change operation of the transmission 12, a vertical movement adjusting switch 18 for controlling the upward or downward movement of the mowing blade unit 14, an engine control lever 19 for adjusting the rotational frequency of the engine 4 and so on. A floor 21 of the traveling machine body 6 has an accelerator pedal 22 and a brake pedal 23, which are placed at positions where the operator may step on.

In use of the mowing machine having the above structure, the operator, after being seated in the seat 9, operates the mowing blade clutch lever 16 to rotate the mowing blade 15 for activating the mowing blade unit 14, and then operates the vertical movement adjusting switch 18 to lower the mowing blade unit 14 to the level of a height enough to allow mowing works. Subsequently, the operator operates the speed change lever 17 to set up and adjust the traveling speed for starting traveling the traveling machine body 6 through the operation of the handle 7 together with the stepping-on operation of the accelerator pedal 22.

With the above operations, the traveling machine body 6 is allowed to travel while being steered by the handle 7, and the mowing machine starts mowing works with the mowing blade unit 14.

The accelerator pedal 22 is connected to the side of the HST 13 to operate the HST 13 through the stepping-on operation, and may be stepped on forwards or rearwards of a neutral position. Thus, the traveling machine body 6 is advanced by stepping on the accelerator pedal 22 forwards for the forward speed change operation of the HST 13. On the other hand, the traveling machine body 6 is backed by stepping on the accelerator pedal 22 rearwards for the rearward speed change operation of the HST 13.

According to the structure of connection between the accelerator pedal 22 and the HST 13, the HST 13 is brought to a neutral state by placing the accelerator pedal 22 to a neutral position, and the front and rear wheels 1, 2 are braked through the transmission by the reaction from the HST 13. Incidentally, a brake is provided in the transmission, and the brake pedal 23 may also be applied to activate the brake in the transmission at need.

Figure 4:
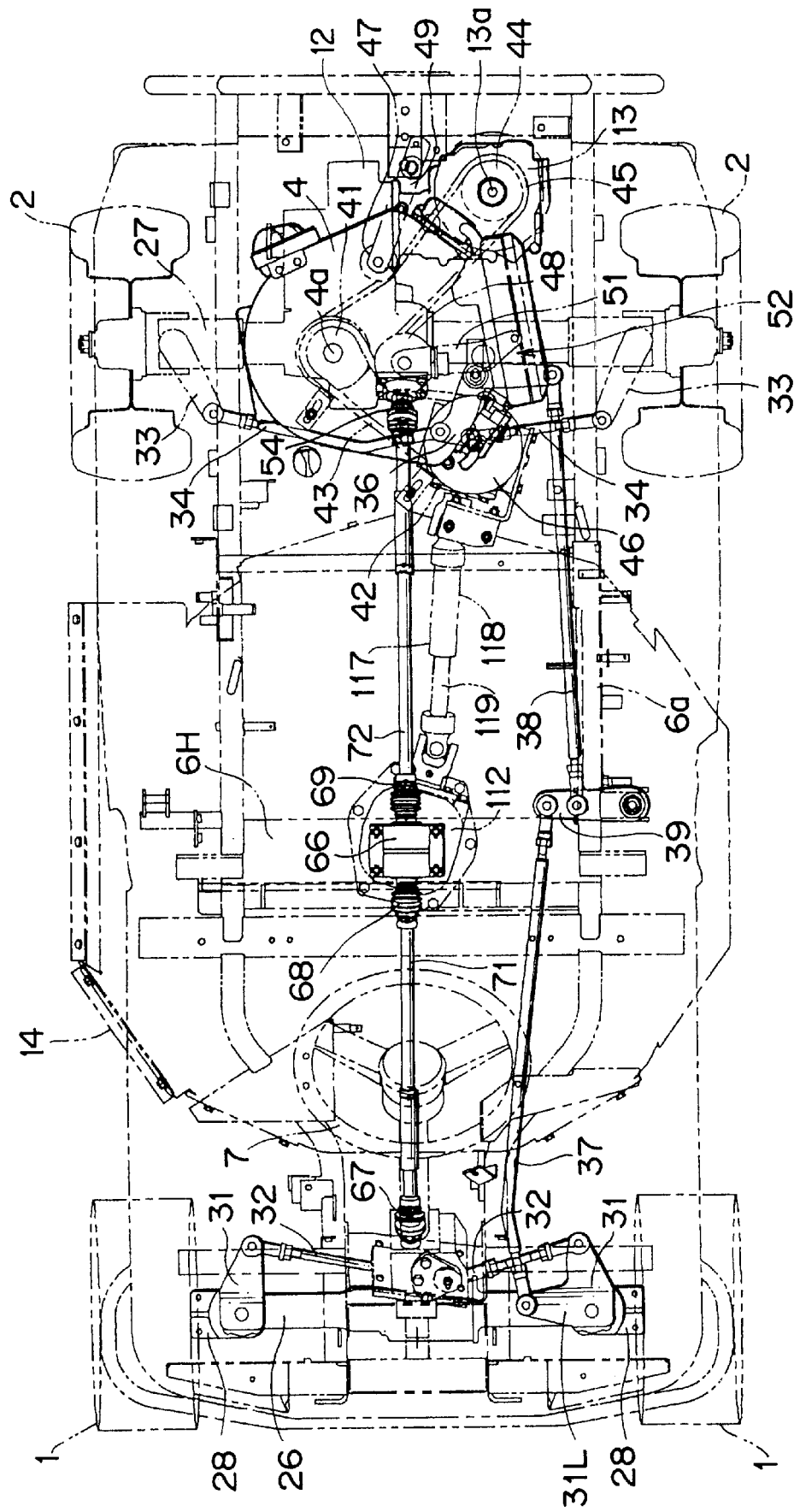
FIG. 4 is a plan view in perspective showing mainly a traveling transmission system of the mowing machine according to the present invention.

As shown in FIG. 4, the left and right front wheels 1 are supported with a front axle case 26, while the left and right rear wheels 2 are supported with a rear axle case 27, respectively. The left and right front wheels 1 are axial-supported with left and right front-wheel axle cases 28 pivotally supported with the front axle case 26. On the other hand, the left and right rear wheels 2 are axial-supported with left and right rear-wheel axle cases 29 pivotally supported with the rear axle case 27. As described the above, the front and rear wheels 1, 2 are mounted to the front axle case 26 and the rear axle case 27 swingably leftwards or rightwards.

A front knuckle arm 31 is mounted to each of the left and right front-wheel axle cases 28, and left and right front tie rods 32 are connected to both the front knuckle arms 31. Since both the front tie rods 32 are connected together on the side of a pitman arm (not shown) for connection to the side of the handle 7 as well known per se, the left and right front wheels 1 are allowed to swing synchronously by the pivotal operation of the handle 7, providing the steered angle to the front wheels 1.

A rear knuckle arm 33 is mounted to each of the left and right rear-wheel axle cases 29, and rear tie rods 34 are connected to both the rear knuckle arms 33. The left and right rear tie rods 34 are also connected together through a connection plate 36. The connection plate 36 is pivotally axial-supported with the rear axle case 27.

One end of a longitudinal rod 38 is connected to the connection plate 36. One end of a longitudinal rod 37 is connected to one front knuckle arm 31L. The other ends of the rods 37, 38 are connected together through an arm 39. The arm 39 is pivotally axial-supported with the machine frame 6a. The rear wheels 2 are also allowed to swing in linkage with the swing action of the front wheels 1 by this mechanism.

The steering mechanism in the mowing machine according to the present invention has the above structure, whereby the front and rear wheels 1, 2 are allowed to swing synchronously for providing the steered angle to each wheel through the pivotal operation of the handle 7. As a result, a four-wheel steering (4WS) mechanism is adapted for steering of the traveling machine body 6.

The above steering mechanism makes it possible to prevent the rear wheels 2 from being slipped and so on when the front wheels 1 are only steered. The above steering mechanism also allows smooth steering even in traveling on the wet road and so on, and besides, provides higher steering performance such as a small sharp turn. Accordingly, the operator may easily steer the traveling machine body 6 and also may easily handle the traveling machine body 6 for ease of mowing works.

In the above steering mechanism, the steered angle of each rear wheel 2 is set to be smaller than that of each front wheel 1 in the same phase in consideration of a prevention of an abrupt turn or the like. The longitudinal rods 37, 38 and the arm 39 in the steering mechanism are disposed to be one-sided leftwards or rightwards (leftwards in the present embodiment) from the center of the traveling machine body 6 in the lateral direction as viewed in plan.

An output gear case 42 for allowing output of the drive force to the mowing blade unit 14 is mounted to the side of the machine frame 6a. An output pulley 41 is mounted to an output shaft 4a of the engine 4, a HST pulley 44 is mounted to an input shaft 13a of the HST 13, and an input pulley 46 is mounted to an input shaft of the output gear case 42.

A belt 45 is passed round the output pulley 41 and the HST pulley 44, while a belt 43 is passed round the output pulley 41 and the input pulley 46. A traveling idler 47 and a mowing blade idler 48 are axial-supported with clutch arms 49, 51, and the traveling idler 47 is pressed against the belt 45, while the mowing blade idler 48 is pressed against the belt 43.

With the above structure, the drive force from the engine 4 is outputted to the HST 13 and the output gear case 42 through the belts 43, 45. Incidentally, while the engine 4 is in operation, the drive force is transmitted from the engine to the HST 13 through the traveling idler 47 at all times.

On the other hand, a mowing clutch 52 for controlling engagement or disengagement of the drive force transmitted for mowing works is formed by the mowing blade idler 48 and the clutch arm 51 or the like, and the mowing blade idler 48 is pressed against the belt 43 through the swing operation of the clutch arm 51. Accordingly, the mowing clutch 52 makes it possible to control engagement or disengagement of the drive force transmitted to the output gear case 42. The clutch arm 51 of the mowing clutch 52 is connected to the mowing blade clutch lever 16 described the above through a wire 121 (See FIG. 6).

Thus, when the mowing blade clutch lever 16 is set to the engagement side position, the mowing clutch 52 is engaged to transmit the drive force toward the mowing blade unit 14. On the other hand, when the mowing blade clutch lever is set to the disengagement side position, the mowing clutch 52 is disengaged to disconnect the drive force transmitted to the mowing blade unit 14.

Figure 5:
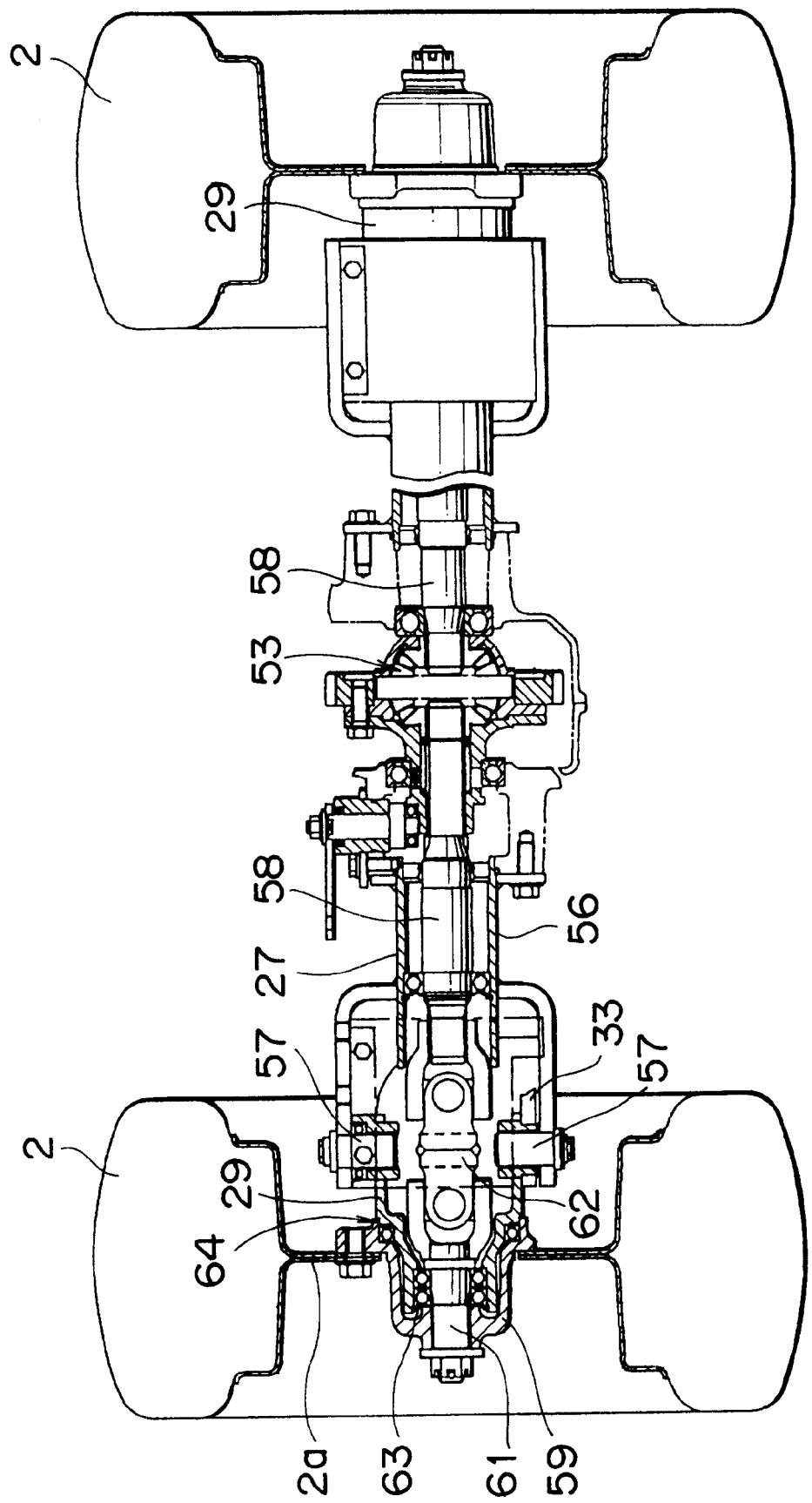
FIG. 5 is a fragmentary rear view in cross section showing a rear axle case of the mowing machine according to the present invention.

The rear axle case 27 and the transmission case 12 are formed as one body, and output from the transmission is directly transmitted to a differential 53 housed in the rear axle case 27 as shown in FIG. 5 for driving the rear wheels 2. An output shaft 54 for driving the front wheels projects from the side of the transmission case 12 forwards. The mowing machine according to the present invention is thus constructed to have a four-wheel drive (4WD) mechanism, in which the front wheels 1 are also driven by the drive force from the output shaft 54, together with the rear wheels 2.

The rear axle case 27 is structured that each rear-wheel axle case 29 is axial-supported with an end of a horizontal case 56 in the lateral direction through upward and downward pins 57 pivotally leftwards or rightwards. An output shaft 58 projecting from the differential 53 is housed in the horizontal case 56. A rear-wheel axle 61 is housed in and supported with each rear-wheel axle case 29 pivotally. The output shaft 58 and the axle 61 are connected together through a universal joint 62.

A wheel boss 59, to which the drive force is transmitted, is mounted to an end of the rear-wheel axle 61. The wheel boss 59 is pivotally supported with each rear-wheel axle case 29 through a bearing 63. A wheel 2a of each rear wheel 2 is capable of being fixed to the wheel boss 59 detachably. Each rear wheel 2 is mounted to the rear-wheel axle 61 by fixing the wheel 2a to the wheel boss 59. As a result, the rear wheels 2 are driven through the differential 53.

One end of the wheel boss 59, i.e., an end on the side of each rear-wheel axle case 29 is supported with a stepped support part 64 of each rear-wheel axle case 29. Thus, this support structure makes it possible to prevent grass or the like from being caught in the wheel boss 59 or the like, and therefore, there is no need for special parts or the like for preventing the grass or the like from being caught in.

A lateral frame 6H forming the machine frame 6a is provided between the front and rear wheels 1, 2. A relay case 66 for relaying the drive force from the output shaft 54 is mounted to the lateral frame 6H. An input shaft 67 for input of drive force projects from the front axle case 26 rearwards.

The input shaft 67 and the relay case 66 are connected together by a second transmission shaft 71 through a universal joint 68. The output shaft 54 and the relay case 66 are also connected together by a first transmission shaft 72 through a universal joint 69. Accordingly, the drive force is transmitted from the output shaft 54 to the input shaft 67 through the relay case 66.

According to the structure on the side of the front axle case 26, although not shown in detail, the drive force supplied through the input shaft 67 according to the structure well known per se is transmitted to the left and right front wheels 1 through the differential for driving the left and right front wheels 1. The four-wheel drive mechanism of the mowing machine according to the present invention is constituted as described the above, When comparing a distance between the front axle case 26 and the transmission case 12 with that between the rear axle case 27 and the transmission case 12, it is found that the front axle case 26 is more remote from the transmission case 12 than the rear axle case 27, since the rear axle case 27 and the transmission case 12 are formed as one body.

For that reason, a transmission part formed by the second transmission shaft 71, the first transmission shaft 72 and the relay case 66 or the like is provided as a remote transmission part for transmitting the drive force to the axle case located more remote from the transmission case in the four-wheel drive mechanism of the above structure, that is, to the front axle case 26.

The relay case 66 is disposed at a position higher than the positions of the front axle case 26 and the rear axle case 27, and also higher than the projection positions of the input shaft 67 and the output shaft 54. The transmission shafts 71, 72 are connected together in the shape of an angle with the connection portion, that is, the relay case 66 as an apex as viewed in side.

According to the above structure, a relatively large space is formed below the relay case 66. That is, a space enough to place the mowing blade unit 14 and the above 4WS transmission mechanism (the longitudinal rods 37, 38 and the arm 39) or the like is ensured. The mowing blade unit 14, the longitudinal rods 37, 38 and the arm 39 are placed in the above space.

While the mowing machine according to the present invention is mounted with the 4WD and 4WS mechanisms below the traveling machine body 6, in addition to the mowing blade unit 14 as described the above, the above structure makes it possible to restrain the traveling machine body 6 (the floor 21) from rising to a height over its required value, that is, an increase in height from the ground to the bottom of the floor. Thus, the center of gravity of the traveling machine body 6 is put at a lower position to ensure the traveling stability.

In particular, while the longitudinal rods 37, 38 and the arm 39 in the 4WS mechanism as described the above are one-sided leftwards from the center of the machine body in the lateral direction, the transmission shafts 71, 72 and the relay case 66 for the 4WD mechanism are placed in the vicinity of a centerline of the traveling machine body 6 in the lateral direction, and the drive system of the mowing blade unit 14 is also placed in the vicinity of the centerline of the traveling machine body 6 in the lateral direction as will be described later. That is, the placement of the above respective parts in need of a space over a required size in the vertical direction in such a way as to place the parts in layers is avoided. Thus, a space required for placing the respective parts is made smaller as much as possible to meet demands for restraining an increase in height from the ground to the bottom of the floor.

Figure 6:
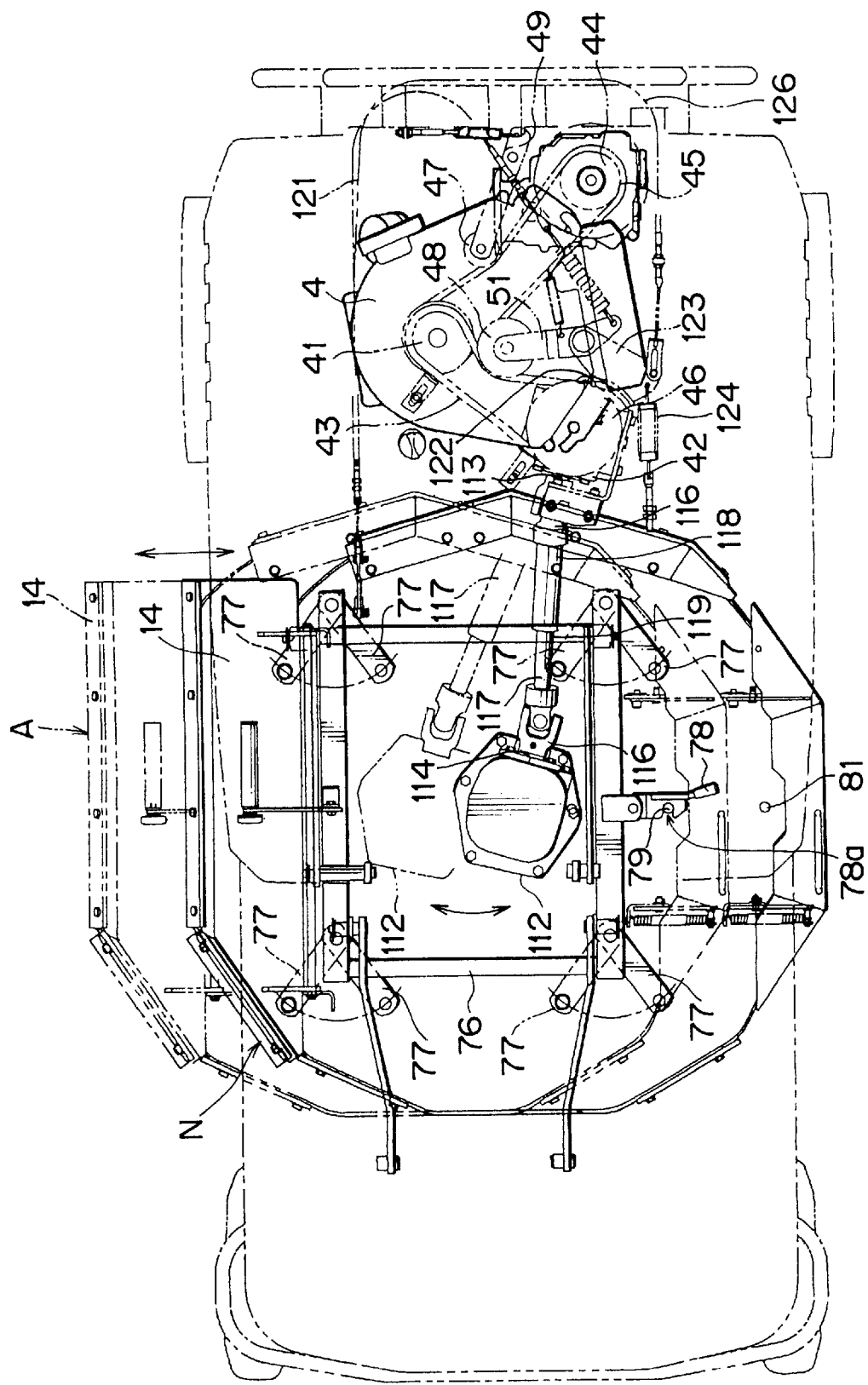
FIG. 6 is a plan view in perspective showing mainly a mowing transmission system of the mowing machine according to the present invention, together with the leftward or rightward translation of a mowing blade unit.

As shown in FIGS. 1 and 6, a frame body 76 supported with the machine frame 6a movably upwards or downwards is provided between the traveling machine body 6 and the mowing blade unit 14. The frame body 76 is formed in a rectangular shape as viewed in plan, and the mowing blade unit 14 is mounted to the frame body 76. An arm 77 is pivotally axial-supported with each apex of the frame body 76, and an end of each arm 77 is pivotally axial-supported with the upper surface of the mowing blade unit 14. Thus, the mowing blade unit 14 is allowed to translate leftwards or rightwards along a semicircular locus by the arms 77.

That is, a switching means is formed by the arms 77 or the like for allowing switching-over of the posture of the mowing blade unit 14 between a one-sided posture A that the mowing blade unit 14 is projected from the side of the traveling machine body 6 in the one-sided state as viewed in plan and a normal working posture N that the mowing blade unit is stored in the center of the traveling machine body 6.

The frame body 76 is provided with an engaging handle 78, which has an engaging recess part 78a for engagement. Pins 79, 81 capable of making engagement with the engaging recess part 78a are provided on the upper surface of the mowing blade unit 14.

The engaging handle 78 is mounted swingably such that the engaging recess part 78a may be engaged with or disengaged from the pin 79 or 81, and a holding means for holding the mowing blade unit 14 after switching over the relative position (the posture) of the mowing blade unit 14 to the frame body 76 is formed by the engaging handle 78, the engaging recess part 78a and the pins 79, 81 or the like. That is, the mowing blade unit 14 is held in the normal working posture N after the position of the mowing blade unit 14 is switched over to the normal working posture N by bringing the engaging recess part 78a into engagement with the pin 79. On the other hand, the mowing blade unit 14 is held in the one-sided posture A after the position of the mowing blade unit is switched over to the one-sided posture A by bringing the engaging recess part 78a into engagement with the pin 81.

Since the posture of the mowing blade unit 14 may be switched over in the lateral direction as described the above, the works for mowing out the grass at the edge in the mowing work range may be performed by switching over the mowing blade unit 14 to the one-sided posture A without allowing the traveling machine body 6 to travel along the course closer to the edge in the mowing work range more than needed.

On the other hand, the works for mowing out the grass in a place (a central portion) other than the edge in the mowing work range may be performed by switching over the mowing blade unit 14 to the normal working posture N in such a way that the mowing works are performed by the mowing blade unit 14 with the traveling machine body 6 located at the substantial center of the mowing work range in the lateral direction. The operator may carry out the mowing works while easily checking the mowing work range with the traveling machine body located at the substantial center of the mowing work range.

Accordingly, the operator may carry out the mowing works smoothly by switching over the posture of the mowing blade unit 14 as described the above depending on the mowing place in the mowing work range.

The mowing blade unit 14 is allowed to translate leftwards or rightwards along the semi-circular locus by the above structure, and the mowing quantity corresponding to a traveling distance of the traveling machine body 6 is made equal even though the mowing blade unit 14 is placed in either of the above postures. Thus, the above structure makes it possible to prevent the mowing efficiency of the mowing blade unit in the one-sided posture A from being degraded, and the mowing works at the edge in the mowing work range may be performed without allowing the traveling machine body 6 to travel longer than needed.

Figure 7:
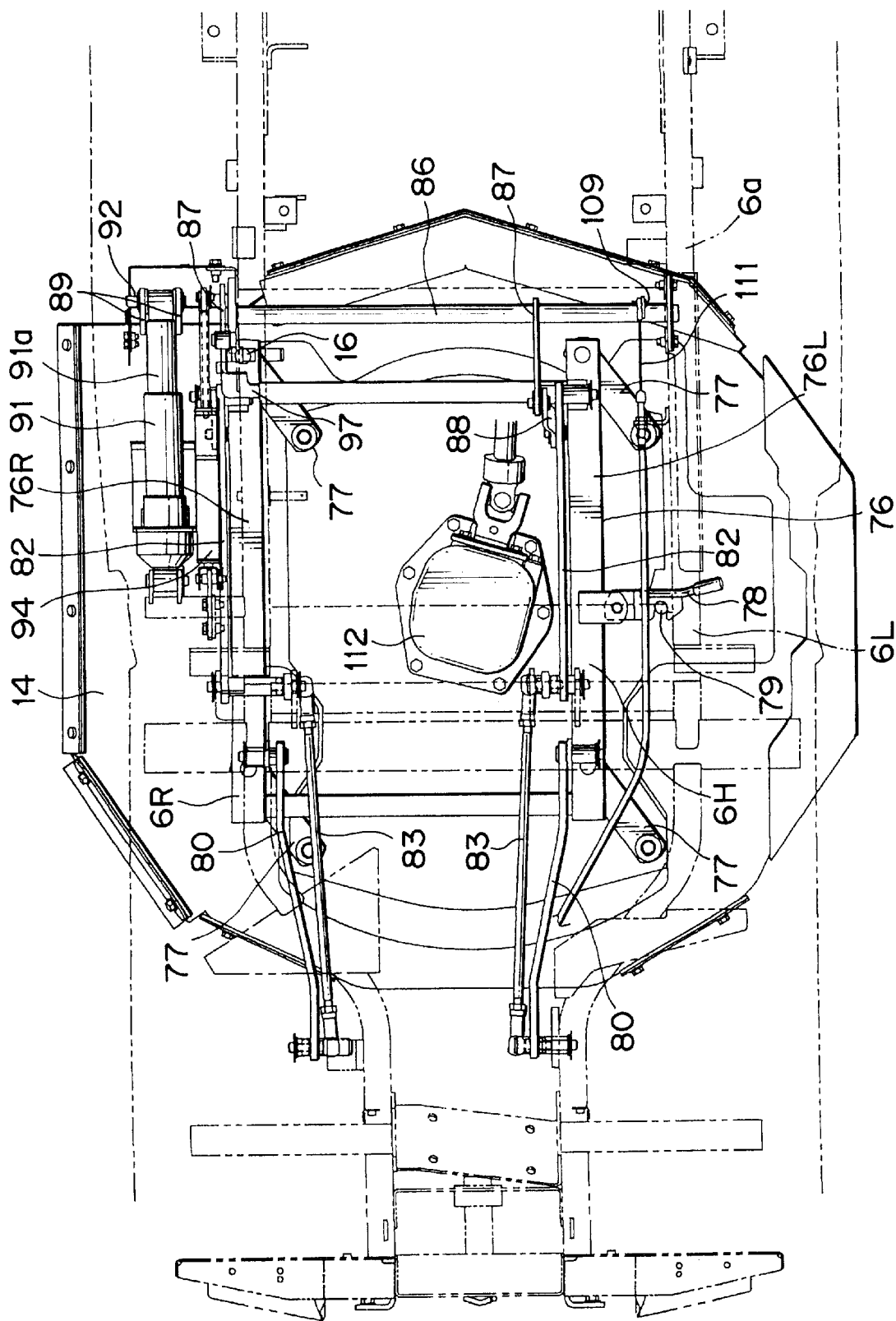
FIG. 7 is a plan view showing mainly the supported state of the mowing blade unit of the mowing machine according to the present invention.
Figure 8:
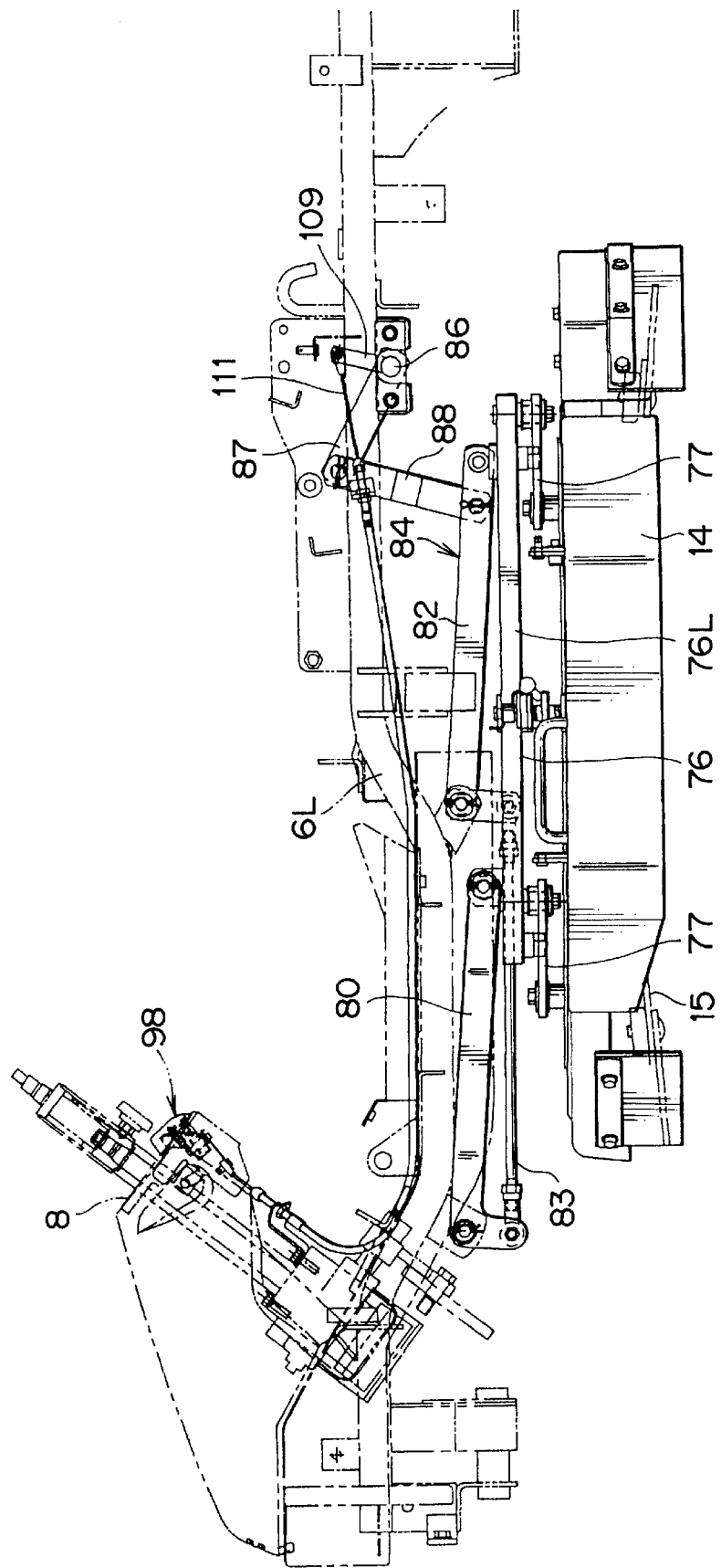
FIG. 8 is a left side view showing mainly the supported state of the mowing blade unit of the mowing machine according to the present invention.
Figure 9:
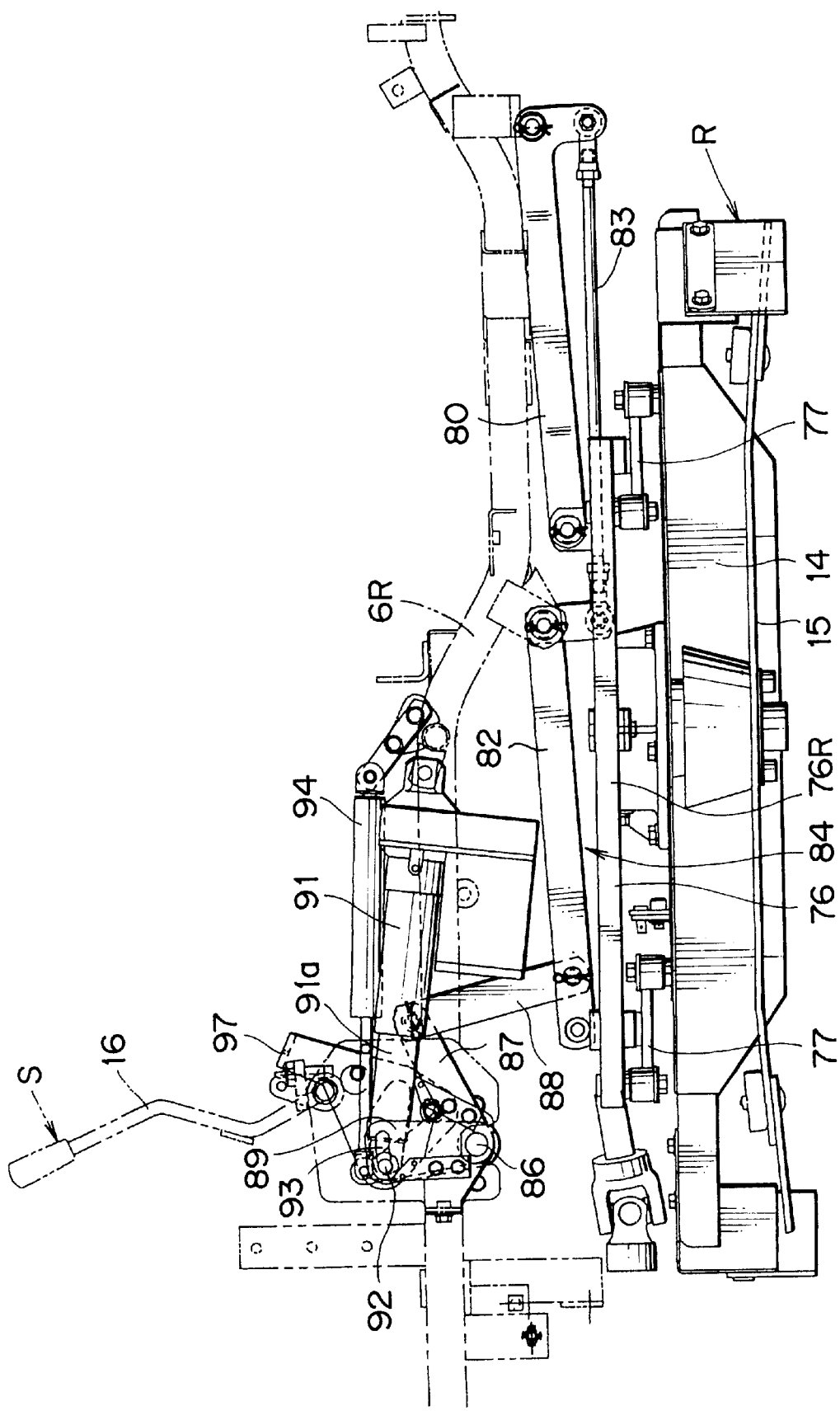
FIG. 9 is a right side view showing mainly the supported state of the mowing blade unit of the mowing machine according to the present invention.

As shown in FIGS. 7 to 9, one ends of front and rear arms 80, 82 are pivotally axial-supported with the front and rear ends of left and right longitudinal frames 76L, 76R forming the frame body 76. The arms 80, 82 are supported with the frame body 76 swingably upwards or downwards. Each of the front and rear arms 80, 82 on the left and right sides extends forwards and is axial-supported with a left frame 6L or a right frame 6R forming the machine frame 6a.

The front and rear arms 80, 82 are connected together through a rod 83, and a parallel link 84 is formed by the front arm 80, the rear arm 82 and the rod 83. The frame body 76 is supported with the machine frame 6a through the left and right parallel links 84 movably upwards or downwards.

A laterally pivotal rod 86 located above the mowing blade unit 14 is pivotally axial-supported with both the longitudinal frame 6L on the left side and the longitudinal frame 6R on the right side. An arm 87 is laterally fixed to the pivotal rod 86 as one body. One end of an arm 88 is pivotally connected to a portion ahead of a point of connection between the left and right rear arms 82 and the longitudinal frames 76L, 76R. The arms 87, 88 are connected together and axial-supported with each other.

A bracket 89 is fixed to an end of the pivotal rod 86 as one body, and an expansion rod 91a of an electromotive cylinder 91 serving as an actuator is connected to the bracket 89. The body side of the electromotive cylinder 91 is axial-supported with the machine frame 6a. Accordingly, the pivotal rod 86 is allowed to pivot by driving the electromotive cylinder 91 for expanding or contracting the expansion 91a at a variable stroke.

The left and right rear arms 82 are swung upwards or downwards through the arms 87, 88 by the pivotal motion of the pivotal rod 86 for allowing the frame body 76 to move upwards or downwards variably through the parallel links 84 with respect to the machine frame 6a.

The mowing blade unit 14 is mounted to the frame body 67 in such a way as to be freely translated leftwards or rightwards as described the above, and the mowing blade unit 14 and the frame body 76 are moved as one body in the vertical direction. Accordingly, the mowing blade unit 14 is allowed to move upwards or downwards variably by means of driving of the electromotive cylinder 91.

The expansion rod 91a of the electromotive cylinder 91 is provided with a pin 92. The bracket 89 is provided with a slot 93. The bracket 89 and the expansion rod 91a are connected together by inserting the pin 92 into the slot 93. Thus, the mowing blade unit 14 is allowed to move upwards by expanding the expansion rod 91a until the pin 92 may be brought into contact with an end (a rear end) of the slot 93.

The pin 92 may be freely moved from the rear end to the front end of the slot 93. Thus, an adaptation mechanism for allowing the upward movement of the mowing blade unit 14 set at a predetermined height is formed by the pin 92 and the slot 93. As a result, the mowing blade unit 14 is allowed to move upwards by a predetermined distance corresponding to the movable range of the pin 92.

By contracting the expansion rod 91a by the above structure until the pin 92 is separated from the end of the slot 93, the frame body 76 and the mowing blade unit 14 are lowered by their own weights such that the pin 92 may make contact with the rear end of the slot 93. Thus, the mowing blade unit 14 is allowed to move downwards.

A damper 94 is provided between the machine frame 6a and the pivotal rod 86, and the mowing blade unit 14 is supported with the machine frame 6a in such a way as to be capable of vertical damping. When force is applied to the mowing blade unit 14 so as to allow the upward movement of the mowing blade unit 14, or when the mowing blade unit 14 runs on to a stone or the like in process of the mowing works, for instance, the damper 94 allows elastically the upward movement of the mowing blade unit 14 through the adaptation mechanism. The mowing blade unit 14, if released from the above force, is restored to its original position elastically by the damper 94.

According to the support structure of the mowing blade unit 14, even if the upward force is applied to the mowing blade unit 14 when the mowing blade unit 14 runs on to the stone or the like in contact therewith in process of the mowing works, the energy applied by contact of the mowing blade unit with the stone or the like is dispersed by the damper 94. Thus, the above support structure makes it possible to prevent troubles such as breakage of the mowing blade unit 14 if occurs when the mowing blade unit 14 makes contact with obstacles such as stones, permitting the stable mowing works.

As described the above, the stroke of the expansion rod 91a may be adjusted variably by the electrically operated electromotive cylinder 91. Thus, the height of the mowing blade unit 14 to the traveling machine body 6, that is, the height of the mowing blade unit to the ground may be set variably with ease.

Figure 10:
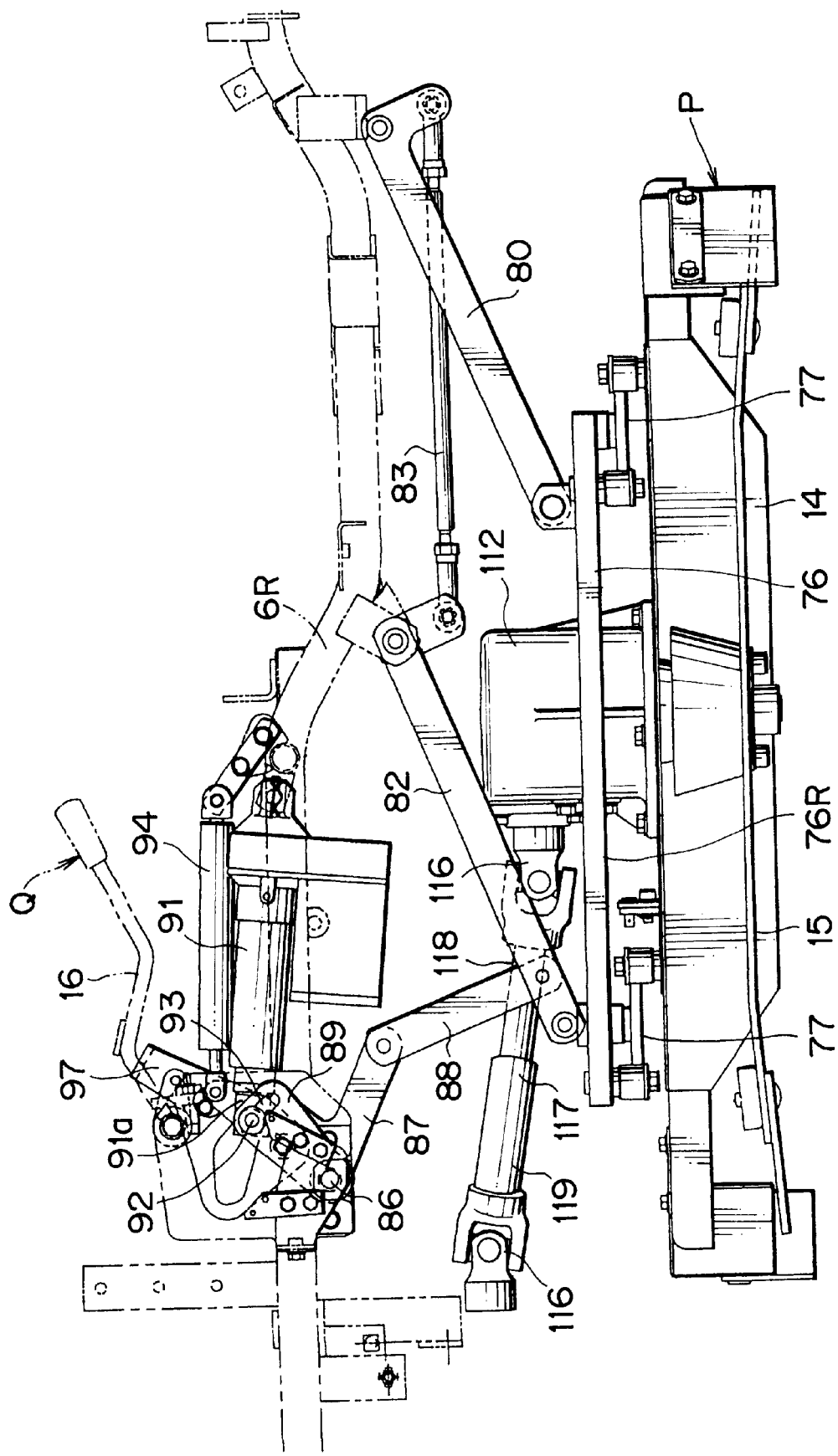
FIG. 10 is a right side view showing a mowing blade unit portion placed at a cutting position.

The height of the mowing blade unit 14 may be adjusted to place the mowing blade unit at a more preferable position by mowing the mowing blade unit 14 variably downwards to a predetermined height as shown in FIG. 10, resulting in higher mowing work efficiency for more stable mowing works. In this case, since a relatively large space is ensured for placement of the mowing blade unit 14 as described the above, the height of the mowing blade unit 14 may be adjusted within a wider range. Further, the mechanisms for upward/downward movement and leftward/rightward translation or the like may be easily placed in the space.

The vertical movement adjusting switch 18 described the above is set to drive the electromotive cylinder 91 for the adjustment of expansion or contraction of the expansion rod 91a. Thus, the vertical position of the mowing blade unit 14 may be easily set by ON/OFF controlling the vertical movement adjusting switch 18.

The pivotal rod 86 described the above also has an interlock bracket 97 making engagement with the mowing blade clutch lever 16. When the mowing blade unit 14 placed in the operated state that the mowing works are performed with the mowing blade unit 14 moved downwards to the cutting position P requiring the mowing works as shown in FIG. 10 is allowed to move upwards to a non-cutting position R requiring no mowing works as shown in FIG. 9, the mowing blade clutch lever 16 is operated automatically by the interlock bracket 97.

Specifically, with the upward movement of the mowing blade unit 14 from the cutting position P to the non-cutting position R, the mowing blade clutch lever 16 is automatically switched over from an engagement position Q for rotating the mowing blade 15 by transmitting the drive force to the mowing blade unit 14 to a disengagement position S for stopping the rotation of the mowing blade 15 by disconnecting the drive force transmitted to the mowing blade unit 14.

That is, the drive force transmitted to the mowing blade unit 14 is automatically disconnected by allowing the mowing blade unit 14 to move upwards from the cutting position P to the non-cutting position R.

Figure 11:
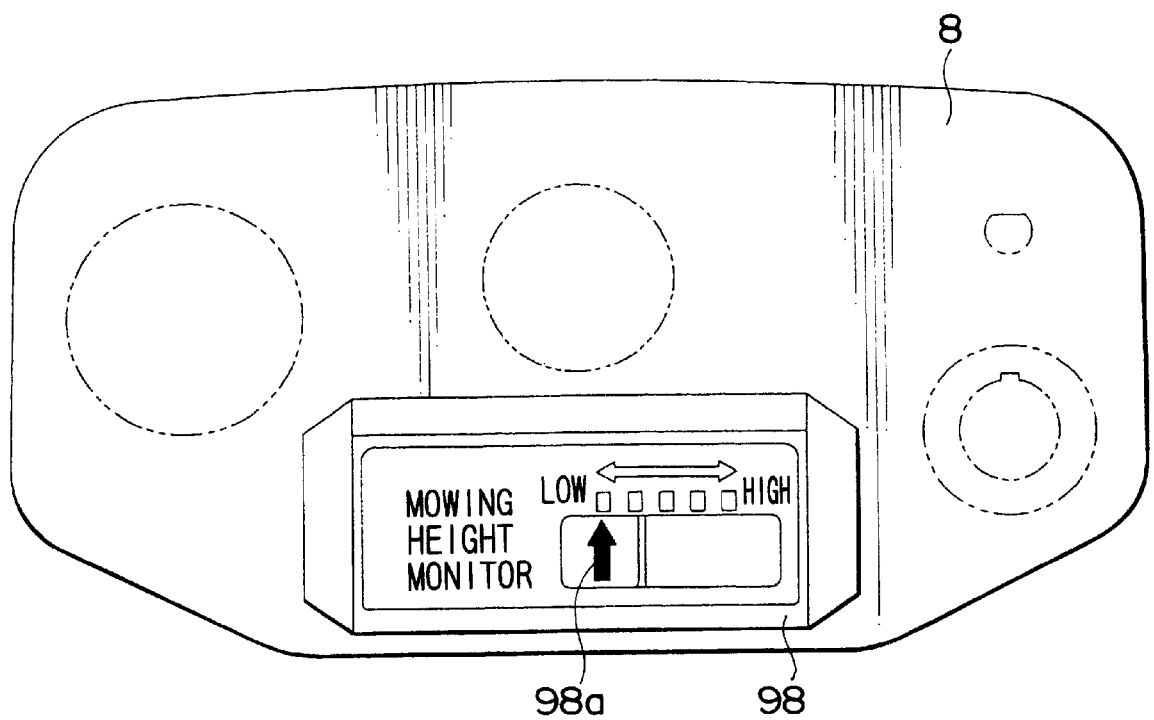
FIG. 11 is a plan view showing a front panel having a height monitor.

As shown in FIG. 11, the front panel 8 in the operator cab 3 has a height monitor 98 serving as an indication unit for giving an indication of the height of the mowing blade unit 14. The seated operator in the seat 9 may easily check the height of the mowing blade unit 14 by watching the height monitor 98 even in the course of operation. In this place, since the height monitor 98 is disposed on the front side, the seated operator may easily check the height of the mowing blade unit 14 without turning away one's eyes from the front side in most cases.

Figure 12A:
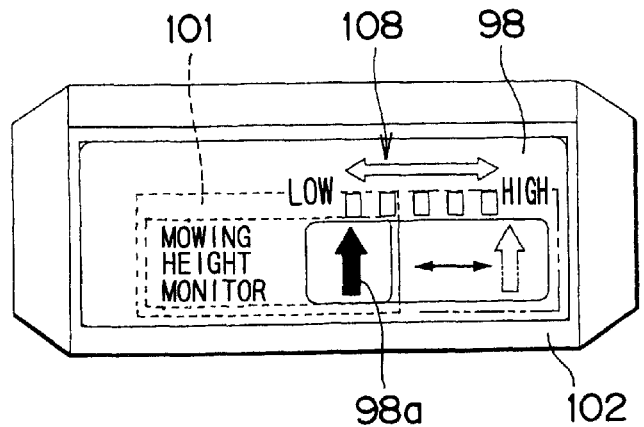
FIG. 12A is a plan view showing the height monitor.
Figure 12B:
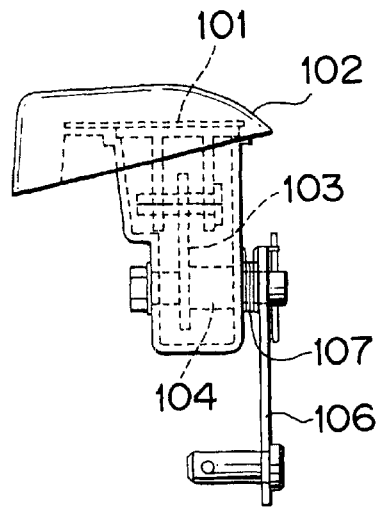
FIG. 12B is a side view showing the height monitor.
Figure 12C:
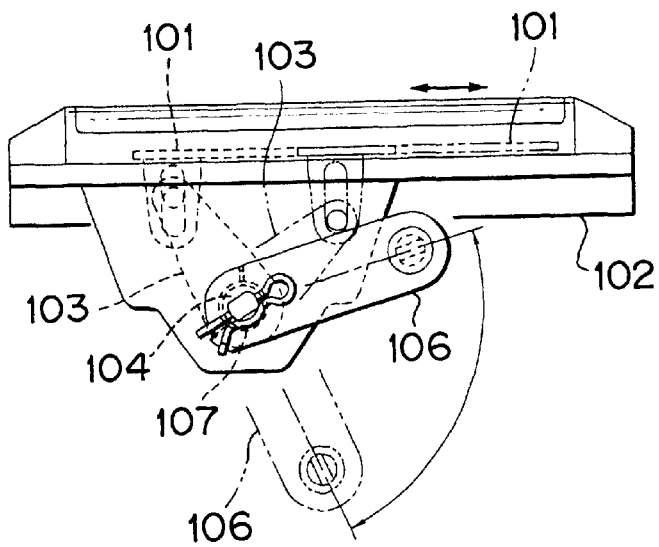
FIG. 12C is a front view showing the height monitor.

As shown in FIGS. 12(a), 12(b) and 12(c), the height monitor 98 has a height monitor body 102 mounted on the side of the front panel 8, a movable body 101 mounted to the body 102 slidably leftwards or rightwards and an operation arm 103 having one end connected to the movable body 101. The movable body 101 is provided with an indicating arrow 98a in a written form or the like. The body 102 is provided with a meter 108.

The other end of the operation arm 103 is pivotally axial-supported with the body 102 through a pivotal supporting shaft 104. A drive arm 106 is integrally fixed to the pivotal supporting shaft 104. A torsion spring 107 is externally fitted to the pivotal supporting shaft 104. An arm 109 is fixed to the pivotal rod 86 described the above. The drive arm 106 and the arm 109 are connected together through a wire 111.

The height monitor 98 has the above structure, and the pivotal rod 86 is pivotally moved by allowing the mowing blade unit 14 to move upwards or downwards as described the above. The drive arm 106 is allowed to swing through the wire 111 by the pivotal motion of the pivotal rod 86, and the movable body 101 is allowed to slide through the operation arm 104. As a result, a change in indication position given by the arrow 98a of the movable body 101 occurs in the meter 108. Thus, the height monitor gives an indication of the height of the mowing blade unit 14.

The movable body 101 is energized by the torsion spring 107 such that the arrow 98a is placed to indicate the low side of the meter 108. Thus, while the wire 111 is loosened by the downward movement of the mowing blade unit 14, the movable body 101 is shifted to the low side of the meter by the action of the torsion spring 107 following the motion of the wire 111, resulting in a correct indication of the height of the mowing blade unit 14.

On the other hand, the output gear case 42 for output of the drive force from the engine 4 to the mowing blade unit 14 is provided on the side of the machine frame 6a. The output gear case 42 is one-sided leftwards from the output shaft 4a of the engine 4, i.e., the output position of the engine 4 as shown in FIGS. 1 and 6. An output shaft 113 is projected from the output gear case 42 and is one-sided leftwards from the center of the traveling machine body 6 and also from the centerline of the traveling machine body in the lateral direction.

An input gear case 112 for input of the drive force is provided on the upper surface of the mowing blade unit 14, and an input shaft 114 is projected from the input gear case 112. The input gear case 112 is located in the substantial center of the traveling machine body 6 in the lateral direction, when the mowing blade unit 14 is placed in the normal working posture N.

The output shaft 113 and the input shaft 114 are connected together by a transmission rod 117 through a universal joint 116, providing a transmission mechanism between the mowing blade unit 14 and the output gear case 42.

As shown in FIGS. 4 and 6, the transmission rod 117 is composed of an externally cylindrical part 118 connected to the output shaft 113 and a rod part 119 inserted into the externally cylindrical part 118 for connection to the input shaft 114. The rod part 119 is formed as a shaft inserted into the externally cylindrical part 118 and allows transmission of the drive force of the externally cylindrical part 118 in the rotary direction, while being slidably expansible with respect to the externally cylindrical part 118. The transmission rod 117 is formed as an expansion shaft expansible in the axial core direction as described the above.

The transmission rod 117 having the rod part 119 connected to the output shaft 113 and the externally cylindrical part 118 connected to the input shaft 115 is also available. The mowing blade unit 14 is allowed to move upwards or downwards and also to slide leftwards or rightwards in the drive force transmitted state by the expansion or contraction of the transmission rod 117. Thus, the drive force may be transmitted in a stable state without varying the transmission efficiency of the drive force in excess depending on the upward/downward movement or leftward/rightward slide motion of the mowing blade unit 14, permitting the upward/downward movement or leftward/rightward translation of the mowing blade unit 14 without varying the transmission performance of the drive force.

Since the output gear case 42 is one-sided leftwards from the output shaft 4a of the engine 4, the input gear case 112, the output gear case 42 and the output shaft 4a of the engine 4 are placed along a broken line (a linear bent line). Thus, the transmission rod 117 may be formed as a relatively longer rod, and the mowing blade unit 14 may be moved upwards or downwards or translated leftwards or rightwards without bending the universal joint 116 in excess. Further, the expansion rod 117 may be expanded or contracted in a stable state.

Figure 13:
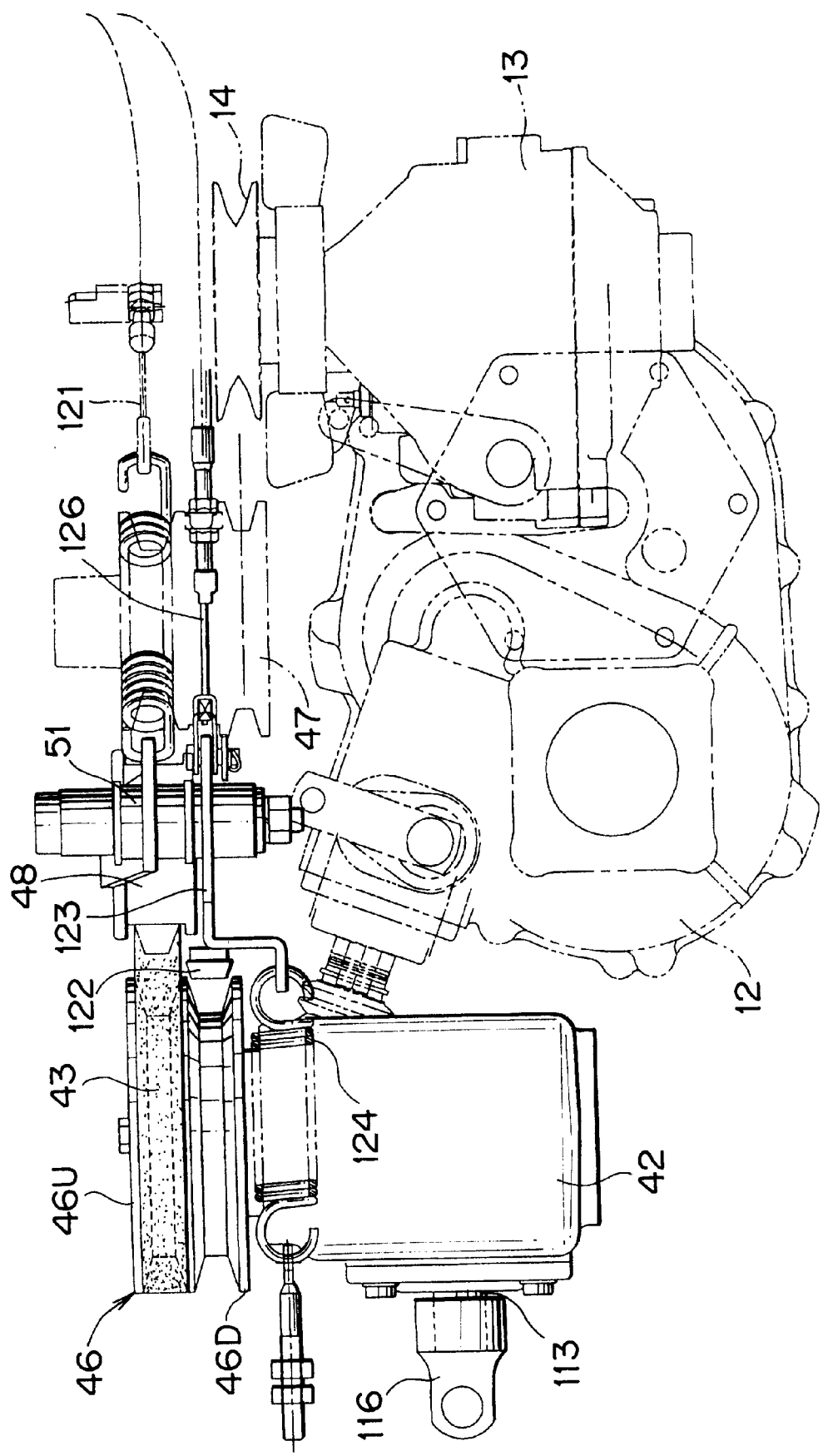
FIG. 13 is a side view showing an input pulley portion.

As shown in FIG. 13, the input pulley 46 is formed as a two-stage pulley composed of upper and lower pulleys 46U, 46D placed in layers. As shown in FIGS. 6 and 13, the upper pulley 46U is connected to the output pulley 41 through a belt. A brake arm 123 is swingably axial-supported in close proximity to the lower pulley 46D. In this place, a brake shoe 122 is mounted to the brake arm 123 face-to-face with the pulley 46D.

The brake arm 123 is axial-supported with the same support shaft as the clutch arm 51 in such a way as to come closer to or be separated from the pulley 46D. The brake arm 123 is energized by a spring 124 such that the brake shoe 122 may be pressed against the peripheral surface of the lower pulley 46D. A brake for stopping the rotation of the input pulley 46 is formed by the brake arm 123, the brake shoe 122 and the spring 124 or the like.

The mowing blade clutch lever 16 and the brake arm 123 are connected together through a wire 126 such that the brake is activated when the mowing blade clutch lever 16 is restored to the disengagement position S.

When the mowing blade clutch lever 16 and the brake arm 123 are coupled together for disconnection of the drive force transmitted to the mowing blade unit 14, the brake is activated to stop the rotation of the input pulley 46, resulting in a stop of the mowing blade unit 14 for a shorter period of time after the operation of disengaging the mowing blade clutch.

According to the mowing machine of the present invention, the mowing blade unit 14, the mechanisms for upward/downward movement and leftward/rightward translation of the mowing blade unit 14, the 4WD and 4WS transmission mechanisms and the mechanism for transmission of the drive force to the mowing blade unit 14 or the like are placed in the space below the traveling machine body 6 as described the above.

Although the remote transmission part of the 4WD mechanism is formed in the shape of an angle by the second transmission shaft 71 and the first transmission shaft 72 to provide the relatively large space for placement of the respective parts as described the above, it is preferable that the space below the traveling machine body 6 for placement of the respective parts is formed as large as possible. However, too much vehicle height is not preferably required from the viewpoint of the traveling stability or the like.

According to the mowing machine in the present invention, a fuel tank 127 is placed on one side of the engine 4 (the right side in the present embodiment) and an oil tank 128 for the HST 13 is placed on the other side (the left side in the present embodiment), as shown in FIGS. 1 to 3. Thus, the machine frame 6a having an upper side of a small height is formed. Even if maintaining the height from the ground to the bottom of the floor to a certain degree to increase the height of the machine frame 6a to a certain degree for enlarging the space below the machine frame 6a, an increase in overall height of the traveling machine body 6 (the mowing machine) in excess does not occur, resulting in no possibility that the center of gravity of the traveling machine body is put at a higher position more than needed.

Accordingly, the stable traveling performance of the traveling machine body 6 may be guaranteed.

That is, the placement of the fuel tank 127 and the oil tank 128 on both the sides of the engine 4 as described the above makes it possible to make sure of a space enough to place the parts or the like of the traveling drive system and the drive supporting system of the mowing blade unit 14 below the traveling machine body 6 without increasing the vehicle height (the overall height) of the traveling machine body 6 more than needed, resulting in less restrictions on the placement and the structure or the like of the mowing blade unit 14 and the drive system or the like. For that reasons, the traveling and steering functions of the traveling machine body 6 and the drive supporting functions of the mowing blade unit 14 or like functions are structured multifunctionally to meet demands for higher performance of the moving machine without sacrificing the traveling stability.

The upper side of the engine 4 and the outside of the fuel tank 127 and the oil tank 128 are covered with side covers 129. A side face 129a of the side cover 129 is inclined toward the upper end side inwardly in such a way that the traveling machine body 6 takes the substantially angular trapezoidal shape as viewed in rear.

When the moving works in an orchard or the like are required, for instance, the inclined structure of the side cover 129 makes it possible to prevent branches or the like from making contact with the functional parts on the side of the traveling machine body 6 in process of traveling for the mowing works and so on, resulting in avoidance of obstacles to the traveling machine body 6 with ease. Since the sides of the engine 4 (the side of the fuel tank 127 and that of the oil tank 128) are covered with the side covers 129, obstacles such as branches may be prevented from entering into the engine 4 through the sides of the traveling machine body 6.

Since the fuel tank 127 is placed on one side of the engine 4, while the oil tank 128 is placed on the other side, the weights on the left and right sides of the traveling machine body 6 are well balanced with each other. Alternatively, when there is no need for the oil tank 128 by the use of the HST 13 of a larger capacity and so on, the fuel tank 127 may be placed on both the sides of the engine 4, or the parts or the like having been conventionally placed in the vertical direction may be shifted to the sides of the engine 4. In this case, the overall height of the traveling machine body 6 may be further reduced.

The structure of placing the oil tank 128 for the HST 13 on the side of the engine 4 as described the above makes it possible to use a smaller HST (requiring less cost) for a relatively high output engine. In this case, the weights on the left and right sides of the traveling machine body 6 are also comparatively well balanced with each other.

What is claimed is:

1. A mowing machine having a traveling machine body, comprising:

a mowing unit disposed below the traveling machine body;

an engine at a rear of the traveling machine body;

a transmission case disposed below and operably connected to the engine;

a four-wheel drive mechanism operably connected to the transmission case for allowing driving front and rear wheels by transmitting drive force from said transmission case to rear and front axle cases;

wherein a remote transmission part for transmitting the drive force to the front axle case from the transmission case in said four-wheel drive mechanism is formed in an upwardly bent or curved shape;

a space for placing the mowing unit is provided below said remote transmission part;

the transmission case has a rear axle case provided integrally therewith;

said remote transmission part has a first transmission shaft connected to an output shaft for output of the drive force from the transmission case, a second transmission shaft connected to an input shaft of said front axle case and a connection part for connecting the first and second transmission shafts together to provide the output of the drive force from the transmission case through the output shaft, the first transmission shaft, the second transmission shaft and the input shaft to the front axle case, and said first and second transmission shafts are connected together in the shape of an angle through the connection part with the connection part being disposed higher than the first and second transmission shafts, the input and output shafts, the transmission case and the front and rear axle cases to define an apex as viewed from an elevational side of the mowing machine.

2. A mowing machine according to claim 1 wherein said mowing unit is supported movably upwards or downwards and movably laterally to and between a central position under the traveling machine body and a side position wherein the mowing unit projects from a side of the traveling machine body.

3. A mowing machine according to claim 2, wherein an expansion shaft expansible in an axial core direction is provided in a transmission mechanism for supplying the drive force to the mowing unit.

4. A mowing machine according to claim 3, wherein said expansion shaft is composed of an externally cylindrical part and an inserted shaft inserted into said externally cylindrical part slidably in the axial core direction while allowing transmission of the drive force of said expansion shaft in a rotary direction.

5. A mowing machine according to claim 3, wherein a gear case for allowing output of the drive force from the engine to the mowing unit is provided in the transmission mechanism, an output part of said gear case is one-sided leftwards or rightwards from the center of the traveling machine body, and an input end of the expansion shaft is connected to said output part.

6. A moving machine according to claim 1, further comprising a four-wheel steering mechanism operative for simultaneous steering of the driving front and rear wheels.

7. A mowing machine according to claim 1, further comprising switching means operative to switch the mowing unit to and between a central position and a side position.

* * * * *